Y. NAGANO.
CAMERA.
APPLICATION FILED OCT. 18, 1921.

1,433,967.

Patented Oct. 31, 1922.
6 SHEETS—SHEET 5.

Inventor
Yashuhiko Nagano
By Lancaster and Allwine
Attorneys

Patented Oct. 31, 1922.

1,433,967

UNITED STATES PATENT OFFICE.

YASHUHIKO NAGANO, OF SAN FRANCISCO, CALIFORNIA.

CAMERA.

Application filed October 18, 1921. Serial No. 508,578.

*To all whom it may concern:*

Be it known that I, YASHUHIKO NAGANO, a citizen of the United States, residing at San Francisco, in the county of San Francisco and State of California, have invented certain new and useful Improvements in Cameras, of which the following is a specification.

This invention relates to cameras of the reflecting type, and the primary object of the invention is to provide a camera of this character, which can be folded or collapsed when not in use, so as to occupy a minimum amount of space, and thereby permit the same to be readily carried around with all the ease of an ordinary camera.

Other objects of the invention are: first, to provide a collapsible reflecting camera having a novel collapsible exposure chamber, which is adapted to readily slide and fold within the case of the camera; second, to provide a novel means for mounting the image reflecting mirror and the ground glass focusing screen within the camera, so as to permit the same to fold within the case of the camera, when the camera is in its collapsed position; third, to provide a novel means for holding the image reflecting mirror in its normal position when the camera is open to its full extent, and a novel means for permitting the mirror to be moved to an inoperative position out of the path of the focal plane, when the shutter is being operated; fourth, to provide a novel focusing hood adapted to collapse within the camera case and a novel means for connecting the focusing hood with the ground glass focusing screen, when the same is in its operative position, so that the said part will be held rigidly against movement; fifth, to provide a novel means for connecting the collapsible exposure chamber with the lens board or base plate, so that the exposure chamber will be automatically moved to its open or closed position upon the actuation of the lens board; sixth, to provide a novel means for operating the shutter controlling means both for instantaneous and time exposures; and seventh, to provide a novel safety blind for the exposure opening and a novel means for connecting the safety blind with the image reflecting mirror, with the shutter operating device and with the camera's ordinary shutter curtain rewind roller.

With these and other objects in view, the invention consists in the novel construction, arrangements and formation of parts, as will be hereinafter more fully described, claimed and illustrated in the accompanying drawings, forming a part of this specification, in which drawings:

Referring to the drawings in detail, wherein similar reference characters designate corresponding parts throughout the several views, the letter A indicates the case of the camera; B, the collapsible exposure chamber; C, the lens and associate parts; D, the focusing hood and supporting structure; E, the focusing screen; F, the image reflecting mirror; G, the safety blind for the exposure opening; H, the means for operating the safety blind, image reflecting mirror and shutter trip mechanism; I, the shutter trip mechanism; K, the time exposure operating mechanism for cooperation with the mechanism H; and L, the release mechanism for the safety blind for cooperation with the curtain shutter rewind roller.

The camera case A is formed comparatively small, owing to the collapsible features of the camera, as will be hereinafter more fully described, and the case is adapted to receive all of the various parts of the camera when the camera is in transit. The case A, as shown, includes a rectangular shaped body of relatively narrow width having the bottom wall 5, the top wall 6, the end walls 7, the rear wall 8, and the front wall 9. The case A is provided with transversely extending partition plates 10 and 11, which define end chambers 12 and 13 for the reception of the film spools when a film strip is being used, and for the reception of the curtain shutter and associate parts when a shutter of this character is used, and a central main compartment 14, in which the exposure chamber B and other parts of the device are adapted to collapse. The front wall 9 is provided at the central portion thereof in alignment with the central chamber 14 with an opening 15, which is adapted to be closed by a door 16, which forms an extension bed for the lens plate and associate parts. The door or extension bed 16 is connected by means of hinges 17 with the body portion of the camera case, and is adapted to swing flush with the front wall of the camera when the camera is in its collapsed position.

The top wall 6 is also provided with an opening 17', so as to permit the folding of the focusing hood D within the same, and this opening is adapted to be closed by a hinged door 18. If desirable, the end walls 7 can be provided with hinged doors 19 so as to facilitate the placing of the film rollers within the camera. The rear wall 8 may also be provided with an opening 20, which can be suitably arranged, so as to receive a sensitized plate attachment, and this opening is also adapted to be normally closed by a suitable door, (not shown). A longitudinally extending partition 21 is arranged within the main compartment 14 in relatively close proximity to the rear wall 8, and this partition 21 is provided with an exposure opening 22. The film strip and the curtain shutter are adapted to pass between the partition 21 and the rear wall 8 in the ordinary manner as is readily apparent. The end compartments 12 and 13 have disposed therein in the ordinary manner, the shafts 25, for the shutter curtain and the shaft in the compartment 13 is adapted to be spring controlled as in the ordinary construction. The shaft 25 in the compartment 12 is provided with a pinion 26 for engagement with a relatively large gear wheel 27, which is utilized for the shutter curtain rewind mechanism. This gear wheel has operatively connected thereto a thumb wheel 28, which is arranged exteriorly of the camera, and it can be seen that by turning the thumb wheel 28, the shutter shaft 25 will be rotated. The upper end of the shaft 25 which is disposed within the end compartment 12, may also be provided with a pinion 28', which can mesh with an upper rewind gear 29. This is of course the usual construction.

As the means of arranging the film rollers or film plate within the camera can be of the ordinary construction, it has not been deemed necessary to show the same in the drawings or describe same within the specification.

The exposure chamber B, as stated, is adapted to normally fit within the central compartment 14, and this chamber consists of a lower wall 30 and an upper wall 31. The upper and lower walls 31 and 30 are formed of metal and are of a frame like construction. This defines a relatively large focusing opening 32 in the upper wall 31, which is surrounded by the focusing hood D. The opening or the lower wall 30 is covered by canvas or leather 30′ the side edges of which are extended to form the side walls 38.

The upper and lower walls 30 and 31 are formed of two sections hingedly connected together as at 33, and when the exposure chamber B is to be folded, these sections are adapted to collapse inwardly toward each other. The terminals of these sections are connected respectively by means of hinges 34, with the front wall 35 of the exposure chamber and with the rear portions 36 of the exposure chamber. The sections 36 are rigidly connected with the longitudinally extending partition 21 which in reality form the rear wall for the exposure chamber B. The front wall of the exposure chamber B is provided with the usual opening 38, which is surrounded by the ordinary type of bellows 39 which forms a part of the lens and associate parts C which will now be described.

The lens and associate parts C are of the usual construction and will be only briefly described. This means C includes the usual adjustable front 40 carrying the ordinary type of lens proper 41, and which front is connected by means of the bellows 39 with the front wall 35 of the exposure chamber B. The front 40 may be adjustably carried by the lens plate 42 or an extension thereof, and is adapted to be moved back and forth in the ordinary manner by a hand wheel 43. The extension bed or hinged door 16 is under cut to provide dove tailed tracks 44 for the dove tailed flanges 45 of the lens board 42, and this lens board is adapted to ride within the stationary bed 46 carried by the bottom wall 5. It can be seen, of course, that the extension bed or door 16 is limited in its downward movement by the ordinary type of folding brackets 47. The side walls 48 of the exposure chamber B are preferably formed of the same material as the bellows 39, so that the exposure chamber can be readily folded to a small compass when the camera is in its collapsed position.

The focusing hood D consists of a collapsible body 50, which is also formed of the same material as the bellows 39 and this collapsible body 50 is secured to the upper wall 31 of the exposure chamber, as heretofore stated, and this body is adapted to fold between the pivoted parts of the top wall 31, when the exposure chamber B is collapsed. The upper end of the collapsible body portion 50 and the focusing hood D may be connected to a suitable frame 51. The hood D is held in its raised position by means of a suitable lazy tong construction 52. This lazy tong construction includes a plurality of pivotally connected crossed levers 53, the lowermost pair of which is pivotally and slidably connected as at 54′, with the front wall 35 of the exposure chamber B. The lowermost pair of levers 53 also carries a novel catch 54, which is utilized for holding the ground glass screen E in its raised horizontal position when the camera is in its fully open extending operative picture taking position. This catch 54 consists of a rod having an angled right angularly disposed end 55, which forms the keeper for engaging the focusing screen E. This rod is rotatably mounted within a suitable collar 56, carried by the lowermost pair of levers 53, and the angularly disposed end 55 thereof is mounted within a spiral guide groove 56′, of a depending guide groove 57, which is carried by the front walls 35 of the exposure chamber B. By means of this spiral slot 56′, the end 55 is turned at right angles to the front wall 35 of the exposure chamber for engaging the focusing screen E, when the lazy tong construction 52 is in its raised position and is turned parallel with the front wall 35 when the lazy tong construction 52 is in its lowered position. The engagement of the hooked end 55 with the focusing screen E will be more fully apparent as the description proceeds.

The screen E and the mirror F forms the means for permitting the object to be readily seen, and the screen is preferably formed of a finely ground glass body 60, which can be mounted within a suitable frame 61. The reflecting mirror F can be mounted within a suitable frame 62. The frames 61 and 62 are mounted respectively upon shafts 63 and 64, in which are mounted coil springs 65′, which normally tend to hold the focusing screen and the image reflecting mirror in a raised horizontal position. The shaft 63 of the screen E is disposed slightly in advance of the shaft 64 of the image reflecting mirror F. Thus it can be seen that the mirror and screen swing on slightly different arcs, the purpose of which will be hereinafter more fully described. These shafts 63 and 64 are disposed adjacent to the rear end of the camera case A adjacent to the upper end thereof, thus allowing the screen E and mirror F to be moved to a vertical position in close parallel relation to the partition or rear wall 21 of the exposure chamber B. The frame 61 of the screen E is provided at its forward end with depending angle catches 65, which are adapted to fit within recesses 66 formed in the side edges of the frame 62 of the mirror F, when the mirror F is in its horizontal raised position. When the screen E and the mirror F are moved simultaneously to their lower vertical position, the hooked ends of the catches 65 will ride under the side edges of the frame 62 of the mirror F and thus insure the simultaneous movement of the screen E and mirror F. It is desirable that these members be moved together upon the opening of the camera, and it is apparent that when the mirror F reaches a diagonal position within the focal plane, the catches 65 will be in such a position as to ride out of the notches 66. The forward edge of the frame 62 at the central portion thereof is provided with a notch 68, so as to permit free movement of the detent or angled end 55 of the rod 54, under the forward edge of the frame 61 of the screen E. Now, when the screen E is in its raised horizontal position, and the hood D is moved to its raised position, the detent 55 will ride under the frame 61 as heretobefore described.

In order to hold the screen E and the mirror F in their vertical lowered positions, the catch 70 is provided. This catch 70 also acts as means for forcibly moving the screen E and the mirror F to their vertical positions. This catch 70 includes an arcuate body or lever 71, which has its inner end pivotally connected to an arm 72, which is rigidly connected to the shaft 64 of the mirror. Adjacent to the upper end of the curved arm 70 is a notch 73, which is adapted to fit under the top wall 6 of the camera case when the screen E and mirror F are in their vertical positions. This effectively holds the same against movement. When the camera is to be opened, it is merely necessary to swing the curved arm 71 rearwardly and the tension of the spring shafts 63 and 64 which will move the screen E and mirror F to their operative positions. The frames 61 and 62 are connected at their side edges by means of collapsible wings 75 which are adapted to be disposed inwardly when the mirror F and the screen E are moved to collapsed vertical position.

In order to positively insure against the admittance of light onto the film or sensitized plate through the exposure opening 22, the safety blind G is provided. This blind G is in the nature of a swinging plate or door, and is connected by means of a suitable shaft 76 with the partition walls 10 and 11 for swinging movement. This plate or door is of a sufficient size to completely cover the opening, and can be covered with some suitable fabric, in order to prevent the entrance of light around the edges of the opening. The normal position of this safety blind G is in a vertical plane in abutting engagement with the longitudinally extending partition 21, and this is also the position it occupies when the camera is in its collapsed state.

Figure 1:
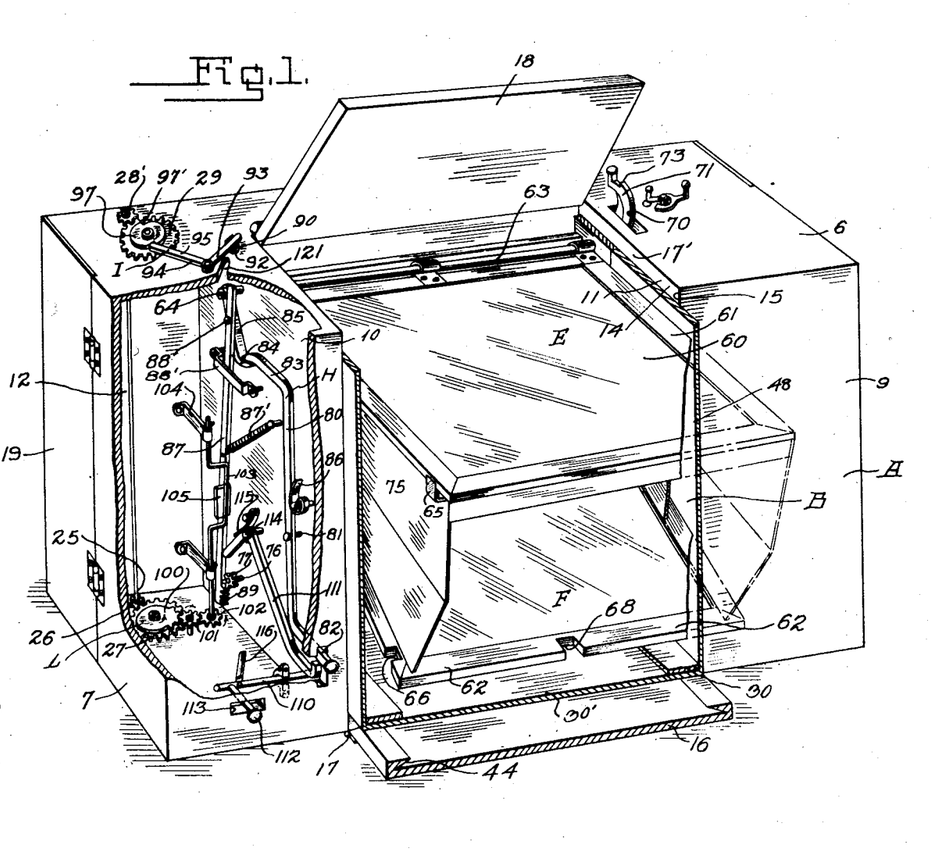
Figure 1 is a perspective view of the camera in its open position, parts of the camera being broken away to disclose the various operating parts thereof.
Figures 2, 3:
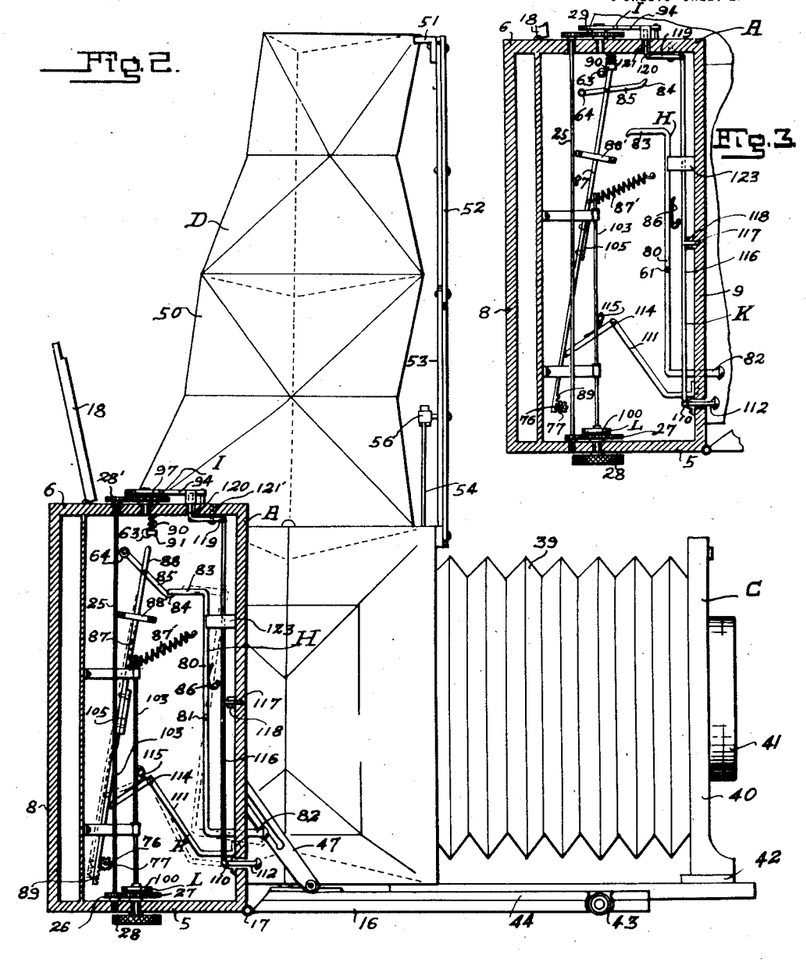
Figure 2 is a side elevation of the camera, showing the same in its fully open position, and the focusing hood in its extended or raised position, parts of the camera case being shown in transverse cross section to illustrate the mirror, shutter and safety blind control.
Figure 3 is a transverse sectional view through the case of the camera, showing the parts above mentioned in their tripped position after the taking of the picture.
Figure 4:
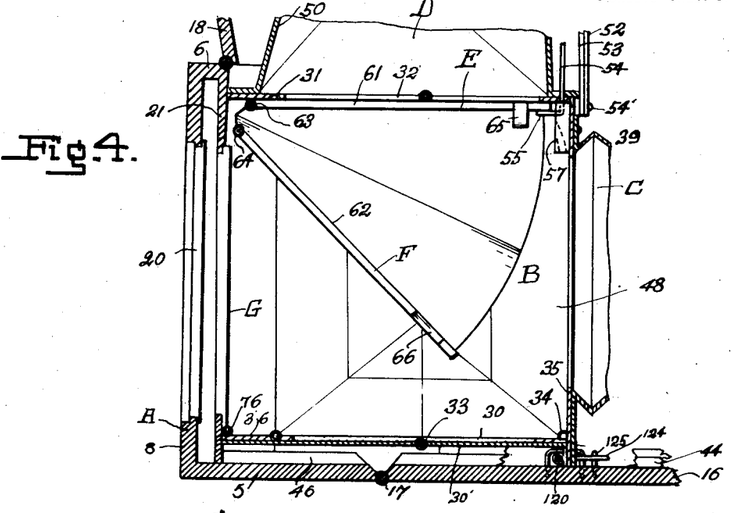
Figure 4 is a central section through the camera showing the exposure chamber in its full open position, and with the reflecting mirror and safety blind in its normal position.
Figure 5:
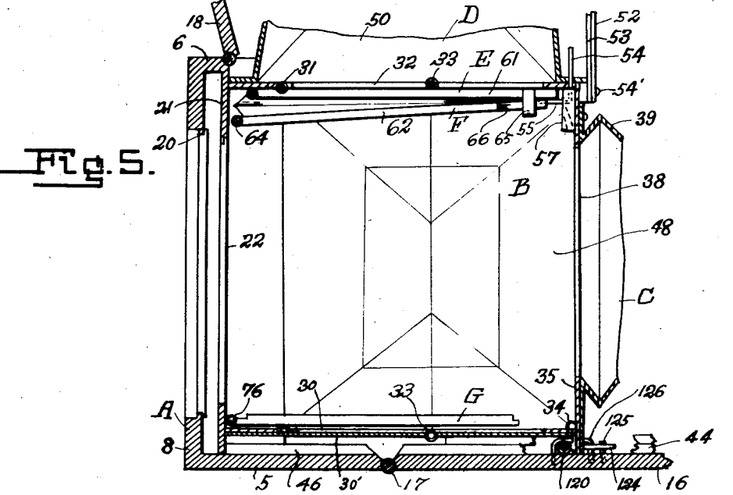
Figure 5 is a similar view showing the mirror and safety blind in position for permitting a picture to be taken.
Figures 6, 7:
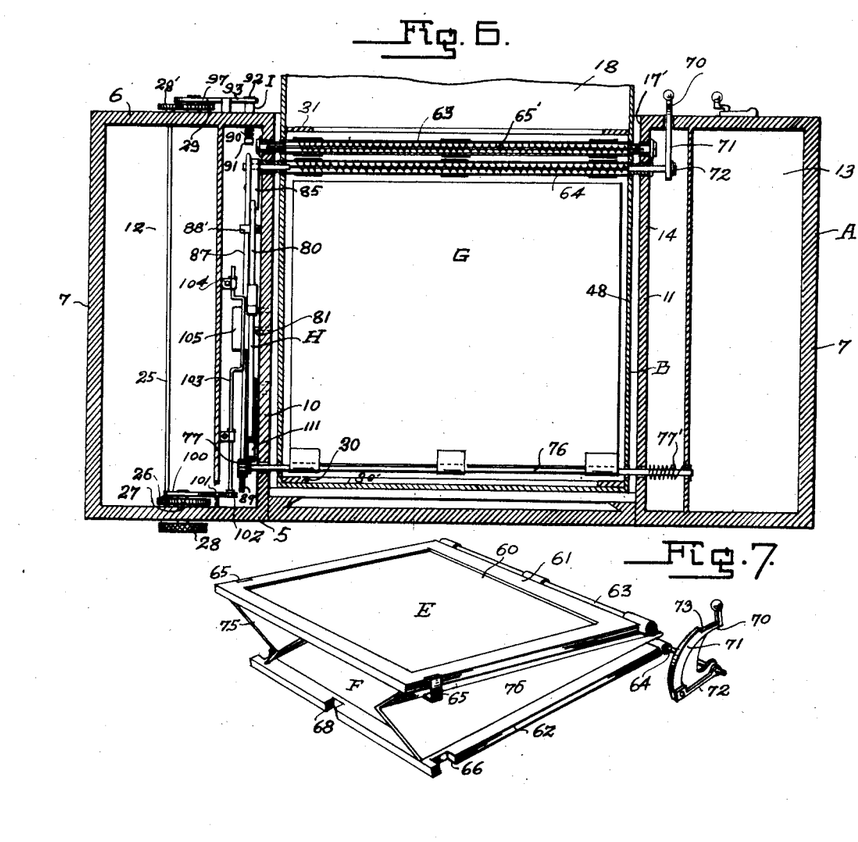
Figure 6 is a vertical sectional view through the camera, taken at right angles to Figures 4 and 5, illustrating the means of mounting the image reflecting mirror and the focusing screen within the exposure chamber, and the operating means for the mirror, safety blind, and the shutter control.
Figure 7 is a detail perspective view of the image reflecting mirror and the focusing screen, and the light proof wings.
Figure 8:
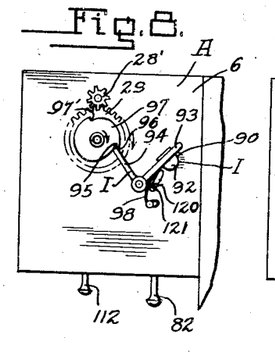
Figures 8, 9, and 10 are fragmentary detail plan views of the camera case, illustrating the various positions of the shutter control.
Figure 9:
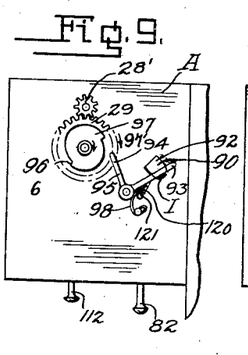
Figure 10:
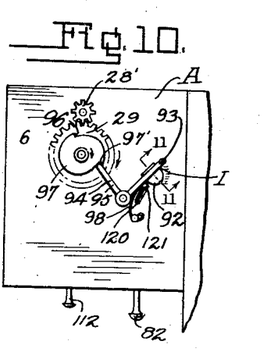
Figure 11:
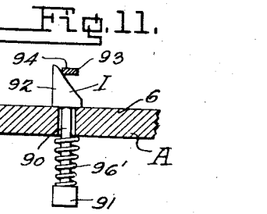
Figure 11 is an enlarged fragmentary sectional view through a portion of the camera case, illustrating the position of the operating pin for the shutter control prior to the actuation thereof.
Figure 12:
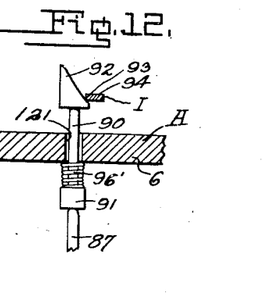
Figure 12 is a similar view illustrating the position of the pin after the actuation thereof.
Figures 13, 14, 15:
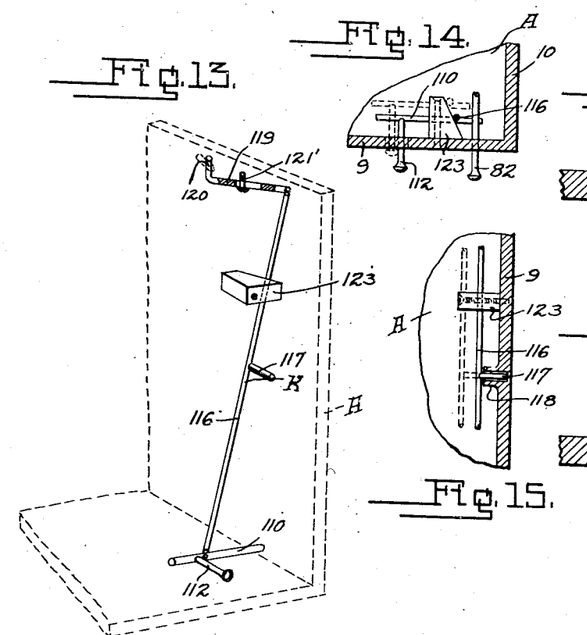
Figure 13 is a detail perspective view of the mechanism utilized for making a time exposure.
Figure 14 is a fragmentary horizontal section through a portion of the camera case, illustrating a portion of the mechanism utilized for time exposures.
Figure 15 is a vertical section through the front wall of the camera case, illustrating the means for connecting the actuating lever of the time exposure mechanism with the front wall.

When a picture is to be taken, the safety blind is moved to a lower horizontal position, as clearly shown in Figure 5 of the drawings. In order that the safety blind may be normally held in its vertical raised position, a suitable coil spring 77' is arranged around the shaft 76 and engages the shaft and a suitable stationary portion of the camera case A. One end of the shaft 76 is provided with a pinion 77, which cooperates with the mechanisms H and L as will be hereinafter more fully described.

The mechanism H for controlling the mirror F, the safety blind G and the shutter trip mechanism I includes a lever 80. This lever 80 is pivotally mounted intermediate its ends upon a pivot pin 81, which can be carried by the partition wall 10 if desirable. The lower end of this lever is provided with a forwardly extending handle 82, which projects outwardly through the front wall 9 of the camera case A. The upper end of the lever 80 is provided with a rearwardly extending arm or detent 83, which is disposed directly in the path of the hooked end 84 of the crank arm 85, which is secured in any preferred manner to the shaft 64 of the mirror F. The lever is engaged by means of a leaf spring 86, and this spring also tends to normally urge the detent 83 in the path of the crank arm 85. This insures the positioning of the mirror in a diagonal plane upon the opening of the camera. Now, it can be seen that when the handle 82 is pressed downwardly, the lever 80 will be swung on its pivot 81 and the detent 83 will be moved out of the path of the crank arm 85, allowing the mirror to be moved to its horizontal position out of the focal plane, thus allowing a picture to be taken. A rod 87 is slidably and swingably carried by the partition 10 and is mounted within suitable guides 88'. This rod is connected adjacent to its upper end by means of a suitable pivot pin 88 with the crank arm 85 and is adapted to be moved therewith. The lower end of the rod 87 is provided with a rack face 89, which at certain times is adapted to be moved into engagement with the pinion 77 which is keyed or otherwise secured to the safety blind shaft 76. Now when the mirror is moved to its diagonal position, the rod 87 will be moved upwardly to the point where the rack face 89 will engage the pinion 77, and when the lever 80 is actuated, the rack face 89 will engage the pinion and turn the shaft 76 and thus move the safety blind G downward into a horizontal position. Thus the mirror F and the safety blind G will be moved out of the focal plane simultaneously with the operation of the lever 80. Now, when the mirror F and the safety blind G have have been moved out of the focal plane, it is of course desirable that the picture be taken at once, and the crank arm 130

85 is utilized for operating the shutter trip mechanism I which will now be described. This trip mechanism I cooperates with the ordinary shutter operating means.

The trip means I of the shutter includes a vertically sliding pin 90, the lower end of which is provided with a body 91, which can either be disposed within the path of the crank arm 85 or a member actuated by the crank arm. As shown, the rod 87 is extended above the crank arm 85 and is adapted to engage the body 91. This pin 90 extends through the upper wall of the camera case A and is provided with a cam head 92, which is adapted to engage one arm 93 of a bell crank 94. The other arm 95 of the bell crank is normally disposed within the path of teeth 96 and 97' formed on the cam wheel 97, which is mounted for movement with the rewind gear wheel 29 of the curtain shutter mechanism. This bell crank 94 is pivotally mounted at its angle upon the upper wall 6 of the camera case A. The pin has coiled around the same an expansion spring 96' which normally urges the pin downwardly and the head 92 below the arm 93 of the bell crank 94, so as to permit the arm 95 to engage the tooth 96 of the cam wheel 97. The tooth 96 is formed relatively bigger than the other tooth 97' so as to be detained by the crank arm 94 after the discharge of the tooth 96. Now, it can be seen that upon operation of the lever 80, the rod 87 will strike the pin and move the same upwardly and the cam face 92 thereof will engage the arm 93 and swing the same inwardly and move the arm 95 out of engagement with the tooth 96 of the cam wheel 97. This permits the actuation of the shutter, by the tension roller thereof. The pin 90 will at once resume its normal position under the influence of the spring 96' and the bell crank 94 will be moved back to its normal position by means of a spring 98, thus the arm 95 will be moved in the path of the next tooth 97' of the cam wheel 97.

Now, upon the resetting of the curtain shutter by the rewind curtain wheel 28, the safety blind will be returned to its normal position by the mechanism L, which will now be described. The mechanism L includes a wheel 100 having a few gear teeth disposed on the periphery thereof, which is connected through means of an intermediate pinion 101 with a pinion 102, which is keyed to a crank shaft 103. This wheel 100 is disposed for movement with the rewind gear wheel 27. The crank shaft 103 is mounted for rotary movement in suitable bearing brackets 104, which can be connected in any preferred manner to a stationary portion of the camera case A. The crank portion of the crank shaft 103 is adapted to engage a suitable block 105, which can be carried by the rod 87. Thus upon turning movement of the crank shaft 103, upon actuation of the rewind mechanism, the crank portion of the shaft will engage the block 105 and force the rod 87 rearwardly, and thus move the rack face 89 thereof out of engagement with the pinion 77, thereby allowing free rotary movement of the shaft 76 under the influence of the spring 77'. This allows the blind to be moved to vertical position from its horizontal position during opening of the shutter 22, and by reason of the construction of the wheel 100 when the hand wheel 28 is operated, it will give the gear 100 only one revolution, so as to permit the rod 103 to resume its normal position. The mirror can be returned to its normal position, by means of the curved arm 71, if desirable.

Now, the means K, which is utilized for permitting time exposures to be made, comprises a sliding bolt 110, which is disposed for movement underneath a bell crank lever 111, the outer end of which is disposed directly below the actuating handle 82 of the lever 80. This bolt 110 is provided with an outwardly extending handle 112, which is disposed in a slot 113, formed in the front wall 9 of the camera case A. The bell crank 111 is pivotally mounted at its angle upon a pivot pin 114, which can be carried by a suitable stationary portion of the camera case. The inner arm of this bell crank lever 111 is disposed relatively close to the rod 87, and is normally urged out of engagement with the same by means of a spring 115. Now, the bolt 110 has pivotally connected thereto a connecting rod or lever 116, which is pivotally mounted intermediate its ends upon a pin 117. Now, the means of connecting the lever 116 with the bolt 110 and with the other portions of the device, has only been shown by way of example, and it is to be understood that other means may be employed. The pivot pin 117 is slidably and pivotally mounted within a sleeve 118 carried by the front wall 9, and the upper end of the lever 116 is pivotally connected to a suitable arm 119, which is provided with an upwardly extending curved end 120, which is adapted to ride within a slot 121, formed in the upper wall 6 of the camera case A. This arm 119 is pivotally mounted intermediate its ends upon a suitable pin 121, carried by a rigid portion of the camera case A. Now when the bolt 110 is slid in one direction, that is, outwardly, the lever 116 will be swung on its pivot, which in turn will swing the arm 119, and during the swinging movement of the lever 116, the same will engage a cam 123, which will move the lever 116 and the lever 119 forwardly, and thus the upwardly extending end 120 thereof will be moved in the slot 121 into the path of the bell crank 94, and thus prevent movement thereof. The sliding movement of the arm 119 is accomplished, owing to the fact that this arm is slidably, as well as pivotally, mounted upon pin 121'. Now, when the bolt 110 is moved inwardly, the inner end thereof will be positioned under the bell crank 11, which will prevent actuation thereof.

When a time exposure is to be taken, the bolt 110 is moved upwardly so as to position the angular head 120 of the lever or arm 119 in the path of the bell crank lever 94, so as to limit the swinging movement thereof. The actuating handle 82 is then depressed, which swings the end 83 thereof from out of the path of the crank arm 84, which allows the crank arm free swinging movement and thus the mirror will be moved to a horizontal position and the rod 87 will force the safety blind to be moved to its lower horizontal position. Simultaneous with this operation, the rod 87 will be lifted up and actuate the bell crank 94, and swing the arm 95 from out of engagement with the tooth 96. Inasmuch as the second tooth 97' is formed slightly larger than the first tooth 96, the crank arm will release the first tooth and detain the second tooth, thereby holding one opening of the shutter curtain in alignment with the camera exposure opening 22, so as to permit the entrance of the image ray on to the sensitized element. The desired length of time is then allowed to lapse, and the handle 82 is then depressed as in the ordinary manner of taking an instantaneous exposure, which will force the bell crank lever to be swung on its rod 87. This will force the rod 87 rearwardly against the tension of this spring 87', which will force the rack face 89 from out of engagement with the pinion 77, which will allow the safety blind to be moved to its closed position under the influence of its spring 77'. The picture has then been taken.

In use of the improved camera, when it is desired to open the same to take a picture, the door or extension bed 16 is moved to its lower position and the door 18 opened. The base plate or lens board of the portion C of the camera is then grasped in the ordinary manner and moved out upon the extension bed, which will actuate the exposure chamber B and move the same to its fully opened position by a mechanism which will be hereinafter more fully described. The upper frame 51 of the focusing hood D is then grasped and moved upwardly, and the lever 71 is operated so as to permit the screen E and mirror F to move to their operative position. When the focusing hood D has been moved to its fully extended position, the catch 54 will engage the screen and hold the same in its operative position as heretofore described. The mirror F will be held in its diagonal position by means of the lever 80 and the crank arm 85 as heretofore described. The camera is then ready to be used to take a picture in the manner heretofore described.

Figure 16:
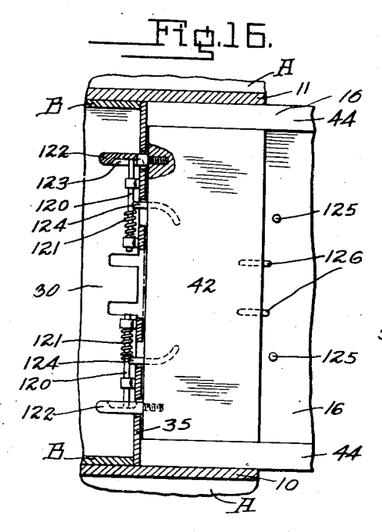
Figure 16 is a fragmentary horizontal section through a portion of the camera, illustrating the means utilized for connecting the collapsible exposure chamber with the lens board.
Figure 17:
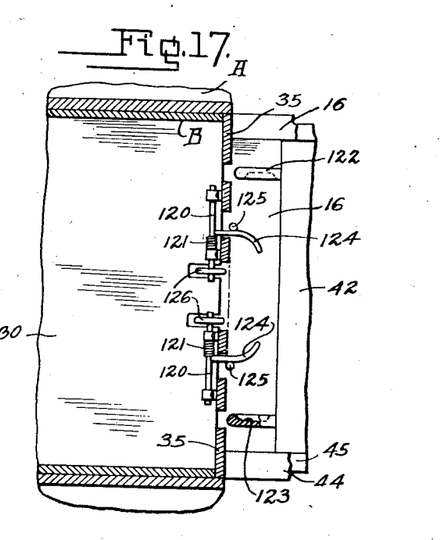
Figure 17 is a similar view showing means for disconnecting the exposure chamber from the lens board, when the exposure chamber has reached its full open position.
Figures 18, 19, 20, 21:
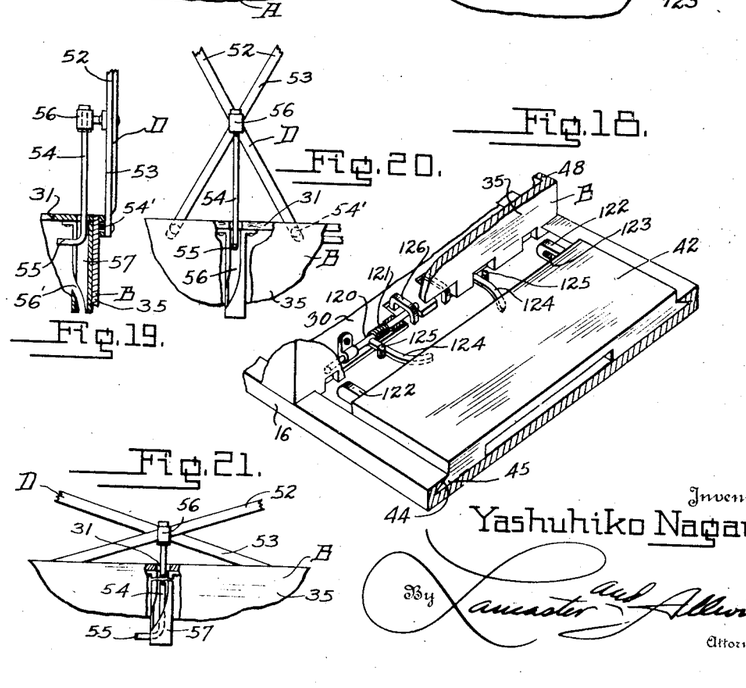
Figure 18 is a fragmentary detail perspective view of the means utilized for connecting the exposure chamber with the lens board.
Figure 19 is a fragmentary detail vertical section through the forward portion of the exposure chamber illustrating the means of connecting the focusing hood with the glass focusing screen, when the screen is in its raised operative position.
Figure 20 is a fragmentary front elevation of a portion of the exposure chamber, and the focusing hood, showing the latch in its raised position for engaging the glass focusing screen.
Figure 21 is a similar view, showing the position of the latch when the focusing hood is in its lower collapsed position.

The means for moving the exposure chamber B outwardly with the lens board 42 consists of a pair of sliding bolts 120, which are mounted for sliding movement upon the front wall 35 of the exposure chamber B. These bolts have coiled around the same expansion springs 121, which are adapted to force the bolts outwardly in opposite directions, so as to engage the rearwardly extending pins 122 carried by the lens board 42. These pins 122 are provided with notches 123 in which are adapted to seat the bolts. The pins 122 are adapted to ride in the exposure chamber through suitable openings formed in the front wall 35 thereof. Each of the bolts 120 are provided with outwardly extending curved handles 124, which are disposed in the path of rigid pins 125, mounted upon the extending bed or door 16 of the casing A, and it can be seen that when the lens board has been pulled outwardly to a certain extent, the curved handles 124 will engage the rigid pins 125, and thus force the bolts inwardly against the tension of the springs 121, and move the bolts out of engagement with the pins 122, thus allowing free forward movement of the lens board 42. In order to hold the safety chamber B rigid in its extended position, the bolts may engage suitable enlarged eyes 126, carried by the door or extension bed 16. These eyes allow a certain sliding movement of the exposure chamber in order to permit movement of the bolts 120 by the pins 125. The operation of the bolts can be clearly seen from Figures 16 to 18 inclusive.

From the foregoing description, it can be seen that a reflecting camera has been provided, which embodies a number of novel features, and which can be folded or collapsed so as to occupy a minimum amount of space.

Changes in details may be made without departing from the spirit or scope of this invention; but,

I claim:

1. In a reflecting camera, a relatively narrow rigid case having a central compartment and side compartments, a collapsible exposure chamber disposed in said case for movement into and out of said central compartment, a collapsible focusing hood carried by the upper portion of the collapsible exposure chamber for moving into and out of the central compartment, an adjustable front, a lens carried by said front, and a bellows structure connecting the front portion of said collapsible exposure chamber with said adjustable front.

2. In a reflecting camera, a relatively narrow rigid camera case including a central and side compartments, a collapsible exposure chamber including a stationary rear wall having an exposure opening therein, a sliding front wall, and collapsible top, bottom and side walls, the top wall having a focusing opening therein, the exposure chamber being arranged for movement into and out of said central compartment, a collapsible focusing hood carried by the upper collapsible wall of the chamber for movement into and out of the central compartment, an adjustable front, a lens carried by the front, and a collapsible bellows structure connecting the slidable front wall of the exposure chamber with said adjustable front.

3. In a reflecting camera, a relatively narrow case including a central compartment, an exposure chamber arranged in said compartment for movement into and out of the same, including a rigid rear wall, a sliding front wall, and collapsible top, bottom and side walls, the rear wall having an exposure opening therein, the top wall having a focusing opening therein, a pivoted focusing screen and focusing mirror disposed in the exposure chamber and arranged for movement into a horizontal or a vertical plane, an adjustable front, a lens carried by said front, a collapsible bellows structure connected to the adjustable front and to the sliding front wall of the exposure chamber, and a collapsible focusing hood carried by the upper collapsible wall of the exposure chamber for moving into and out of said central compartment.

4. In a reflecting camera, a relatively narrow rigid case including a central compartment, the compartment having a top hinged wall and a front hinged wall, the front hinged wall forming an extension hood, a collapsible exposure chamber disposed in said compartment and arranged for movement into and out of the same including a rigid rear wall having an exposure opening therein, a sliding front wall and collapsible top, bottom and side walls, the top wall having a focusing opening therein, a collapsible focusing hood structure carried by the focusing mirror and a focusing screen disposed for movement in a horizontal plane and in a vertical plane, and means carried by the collapsible focusing hood for engaging the focusing screen to hold the same in a horizontal operative position when the exposure chamber and the collapsible hood are in their extended open position.

5. In a reflecting camera including a case, a collapsible exposure chamber having an exposure opening therein, a pivoted focusing screen, and a pivoted focusing mirror disposed in the exposure chamber adjacent to the rear end thereof, means normally urging the focusing screen and mirror to a raised horizontal position, means disposed in the path of the focusing mirror for normally holding the same in a diagonal plane in the exposure chamber, means for releasing said mirror engaging means to permit the same to be moved to a horizontal position out of the focal plane, and a releasable catch operatively connected with the focusing mirror and the screen for holding the same in a vertical plane against the tension of said spring means.

6. In a reflecting camera, a rigid case, a collapsible exposure chamber carried by the case for movement into and out of the case, a swinging focusing mirror and screen disposed in the exposure chamber adjacent to the rear end thereof, a collapsible focusing hood carried by the exposure chamber, spring means for normally urging the focusing screen and mirror to a raised horizontal position, means carried by the focusing hood for engaging the focusing screen, when the hood is moved to its raised operative position for holding the screen in its operative position against movement, and releasable means disposed in the path of the focusing mirror for holding the same in a diagonal position in the focal plane.

7. In a reflecting camera, a relatively narrow case having a central compartment, a collapsible exposure chamber for movement into and out of said compartment, a collapsible focusing hood carried by the exposure chamber for movement into and out of said compartment, a collapsible lazy tong construction carried by the forward portion of the exposure chamber for holding the attachable focusing hood in a raised position, a rotatable latch carried by the lazy tong construction, means for rotating said latch during the raising and lowering movement of the focusing hood, a pivoted focusing screen, a pivoted focusing mirror, the latch being arranged to be moved into engagement with the focusing screen when the same has been moved to a horizontal position and when the focusing hood has been moved to its raised position.

8. In a reflecting camera, a relatively narrow rigid case including a central compartment, a collapsible exposure chamber for movement into and out of said compartment including a rigid rear wall having an exposure opening therein, a sliding front wall and collapsible top, bottom and side walls, a hinged door for said compartment arranged to form an extension bed when moved to its open position, an extension front, a lens carried by the extension front, a lens board slidably mounted in said extension bed, a collapsible bellows structure connecting said extension front with the front wall of the exposure chamber and means for releasably connecting the lens board with said exposure chamber to permit the same to be moved to its open position upon forward movement of the lens board.

9. In a camera, a relatively narrow rigid case and a collapsible exposure chamber for movement into and out of said case including a rigid rear wall having an exposure opening, and a sliding front wall, and collapsible side, top and bottom walls. a hinged door for the case forming an extension bed when moved to its open position, an adjustable front, a lens carried by the adjustable front, a lens board slidably mounted on the extension bed, releasable means for connecting the lens board with the collapsible exposure chamber, and means carried by the extension bed for engaging said releasable means when the exposure chamber and lens board reach a predetermined position for permitting the free forward movement of the lens board.

10. In a camera, a rigid case, a collapsible exposure chamber arranged in said case including a sliding front wall, an end extension bed carried by the case for movement in a horizontal plane, an adjustable front, a lens carried by said front, a lens board for movement over said extension bed, a collapsible bellows structure connecting said adjustable front with said exposure chamber, a pair of sliding latches carried by the front portion of the exposure chamber, inwardly extending recessed pins carried by the lens board adapted to be engaged by said latches, arcuate handles carried by said latches and stop pins carried by the extension bed for engaging said handles to move said latches out of engagement with said pins when the lens board and exposure chamber reach a predetermined position on said extension bed.

11. In a reflecting camera including a relatively narrow rigid case, and a collapsible exposure chamber, a swinging focusing screen and mirror disposed within the exposure chamber for movement into a vertical and horizontal plane, spring means for normally urging said focusing screen and mirror into a horizontal plane, an arm carried by the focusing mirror for movement therewith, a pivoted trip lever carried by the case for engaging said arm for normally holding the mirror in a diagonal position in the focal plane of the exposure chamber, an actuating handle on said lever arranged exteriorly of the case to permit operation of the lever whereby the same can be moved out of the path of said arm to permit the mirror to be moved to its horizontal position.

12. In a reflecting camera, a case, a collapsible exposure chamber, a shutter control including a cam wheel, means for engaging the cam wheel to prevent movement thereof, a pivoted focusing mirror and screen disposed within the exposure chamber, spring means normally urging the focusing mirror and screen to a horizontal position, a crank arm carried by the mirror for movement therewith, a pivoted lever disposed within the path of the crank arm for holding the mirror within the focal plane of the exposure chamber, an operating handle on said lever for permitting operation thereof, and means actuated by said crank arm for operating the member engaging said cam wheel to move the member out of engagement with the cam wheel.

13. In a reflecting camera, a relatively narrow rigid case including a central and side compartments, an exposure chamber including a rigid rear wall and an adjustable front wall, the rear wall having an exposure opening therein, a swinging focusing screen and mirror disposed within the exposure chamber, means for normally urging the screen and mirror to a raised horizontal position, means normally holding the mirror in a diagonal plane in the exposure chamber, a safety blind disposed for swinging movement within the exposure chamber and arranged to normally close the exposure opening, and means for simultaneously permitting the mirror to be moved to a horizontal raised position out of normal diagonal position, and for permitting the safety blind to be moved to a horizontal position away from the exposure opening.

14. In a camera, a relatively narrow rigid case and a collapsible exposure chamber disposed within the case, a focusing screen and mirror disposed within the exposure chamber, rotatable spring operated shafts mounted within the case, means for securing the screen and mirror to said shafts, a crank arm secured to the mirror shaft, the exposure chamber having an exposure opening therein, a swinging safety blind disposed in the exposure chamber arranged to normally cover said exposure opening, spring means normally urging the safety blind over said opening, a pivoted actuating lever disposed within the case for engaging said crank arm, an operating handle formed on said lever disposed outwardly of the case for permitting the lever to be moved out of the path of the crank arm, means actuated by said crank arm for moving the safety blind away from said exposure opening, upon movement of the crank arm to a raised position, a shutter mechanism disposed within the case including a cam wheel, a latch for engaging said cam wheel to permit movement thereof, and means actuated by said arm for operating said latch.

15. In a reflecting camera, a case including a shutter mechanism having a cam wheel, a swinging latch arranged to engage the cam wheel to limit the movement thereof, a rewind mechanism for the shutter mechanism, a collapsible exposure chamber, a swinging focusing screen and mirror disposed within said chamber, rotatable spring operated shafts for said focusing screen and mirror, a crank arm carried by the mirror shaft, a pivoted lever arranged to engage said crank arm to hold the focusing mirror in a diagonal plane within the focal plane of the camera, a pivoted lever carried by the case disposed in the path of said crank arm, an operating handle on said lever for permitting the same to be moved out of the path of the crank arm to permit the mirror to assume a horizontal position within the exposure chamber, a sliding pin carried by the case, a cam head formed on said pin for engaging said latch, a swinging safety blind disposed in the exposure chamber, a rotatable spring operated shaft for said blind, a pinion upon said shaft, a sliding and swinging rod pivotally secured to said crank arm, a rack bar formed on the lower end of said bar and arranged to engage said pinion when the crank arm is moved to its horizontal position, and means actuated by the rewind mechanism for swinging the rod away from or out of engagement with said pinion, the rod being adapted to engage said sliding pin upon movement of said crank.

16. A reflecting camera comprising a rigid case, a collapsible exposure chamber having an exposure opening therein, a swinging safety blind for said opening, a rotatable spring operated shaft for supporting said safety blind, a swinging mirror and focusing screen disposed within the exposure chamber, spring operated shafts for said mirror and screen, a shutter mechanism carried by the case, a rewind mechanism for said shutter mechanism, said rewind mechanism including a cam wheel, a pivoted latch carried by the case arranged to engage said cam wheel to prevent movement thereof, a sliding pin carried by the case, a cam head on said pin arranged to engage the latch, a crank arm carried by the mirror shaft for movement therewith, an operating lever pivotally mounted in said case arranged to engage said crank arm for holding the mirror in a diagonal plane, a handle formed on said lever to permit the same to be moved out of the path of the crank arm, a sliding and swinging rod pivotally secured to said crank arm, a rack bar formed on the lower end of said bar to engage the pinion, spring means for normally holding the rod for engagement with the pinion, a pivoted bell crank disposed within the case arranged to engage the rod and disposed directly below said first mentioned lever, a sliding bolt carried by the case arranged for movement toward and away from said bell crank, an angled lever pivotally secured to the case and arranged to be moved into and out of the path of the pivoted latch engaging said cam wheel, and means operatively connecting the belt with said mentioned lever.

17. In a reflecting camera, a case, a detachable exposure chamber, a swinging focusing screen and mirror, rotatable spring pressed supporting shafts for the mirror and screen disposed one in advance of the other, a pivoted latch connected to one of said shafts for normally holding the screen and mirror in a vertical plane the focusing mirror having notches formed in the side edges thereof adjacent to the supporting end thereof, depending catches carried by the side edges of the focusing screen arranged to engage in said notches when the mirror and screen are in their horizontal position, and arranged to slide beneath the mirror when the mirror and screen are in their lowered position.

18. In a reflecting camera, a rigid case, a collapsible focusing hood, a collapsible exposure chamber, a swinging focusing screen and mirror disposed within the exposure chamber, and collapsible light proof flaps connecting the side edges of the mirror and screen together.

YASHUHIKO NAGANO.